May 8, 1928.  1,668,709
L. E. G. BUEHLER
POWER TRANSMISSION MEANS
Filed June 27, 1927   3 Sheets-Sheet 1

Witness:
Harry R. L. White.

Inventor
Louis E. G. Buehler

May 8, 1928.  
L. E. G. BUEHLER  
POWER TRANSMISSION MEANS  
Filed June 27, 1927  
1,668,709  
3 Sheets-Sheet 2

Witness:  
Harry R. L. White

Inventor:  
Louis E. G. Buehler  
By Rudolph M. Lotz  
Atty.

May 8, 1928.  L. E. G. BUEHLER  1,668,709
POWER TRANSMISSION MEANS
Filed June 27, 1927   3 Sheets-Sheet 3
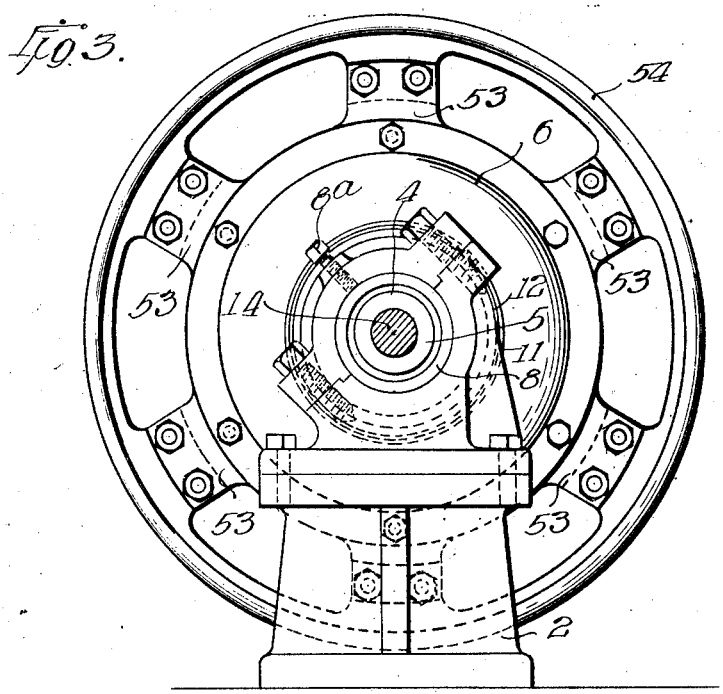
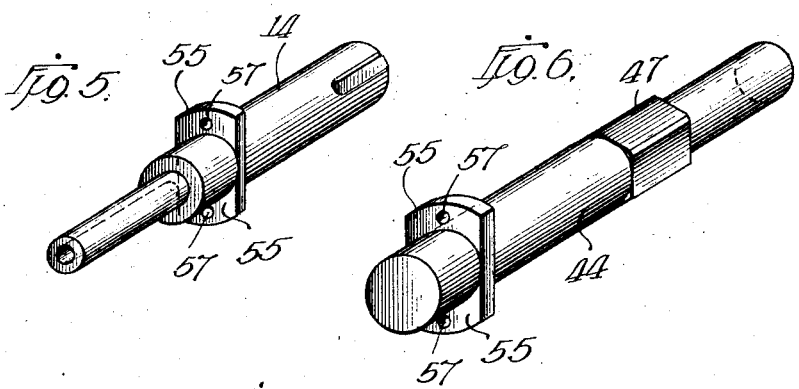
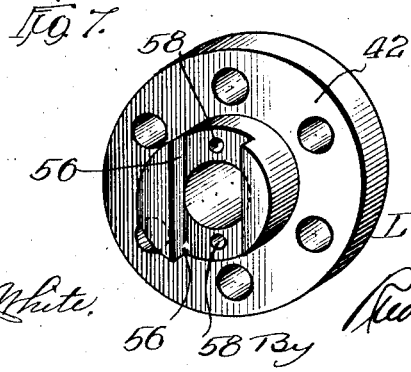
Witness:
Harry C. White.
Inventor:
Louis E. G. Buehler.

Patented May 8, 1928.

1,668,709

UNITED STATES PATENT OFFICE.

LOUIS E. G. BUEHLER, OF OAK PARK, ILLINOIS.

POWER-TRANSMISSION MEANS.

Application filed June 27, 1927. Serial No. 201,608.

This invention relates to improvements in power transmission devices and has for its several main objects to provide a speed reducing gear for pulleys, drums and the like which is substantially completely housed by the pulley, drum or the like; which is capable of being varied in length to accord with the width of the face of the pulley or drum which houses the same without effecting any variation of the speed reducing mechanism per se or its casing, and, finally, to provide a speed reducing mechanism for pulleys, drums and the like equipped with a safety device adapted, in event of overload, to prevent stripping of the gears of the mechanism.

A further important object of the invention is to provide a rotatable housing for speed transforming gearing for the purpose specified which is so mounted in its bearings as to provide for maximum strength and minimum friction while, at the same time, the operating shafts for effecting rotation of the housing are relieved of all strains and stresses other than the torsional strains and stresses incident to the resistance to their free rotation imposed by the load on the pulleys, drum or the like carried by the housing.

The invention has other objects in view relating more particularly to details of construction and will appear and be readily understood from the following specification.

The preferred embodiment of the invention is illustrated in the accompanying drawings, wherein:

Figures 2 and 3 are, respectively, end elevations thereof.

Figures 5, 6 and 7 are detail perspective views of parts of the mechanism.

Figure 1:
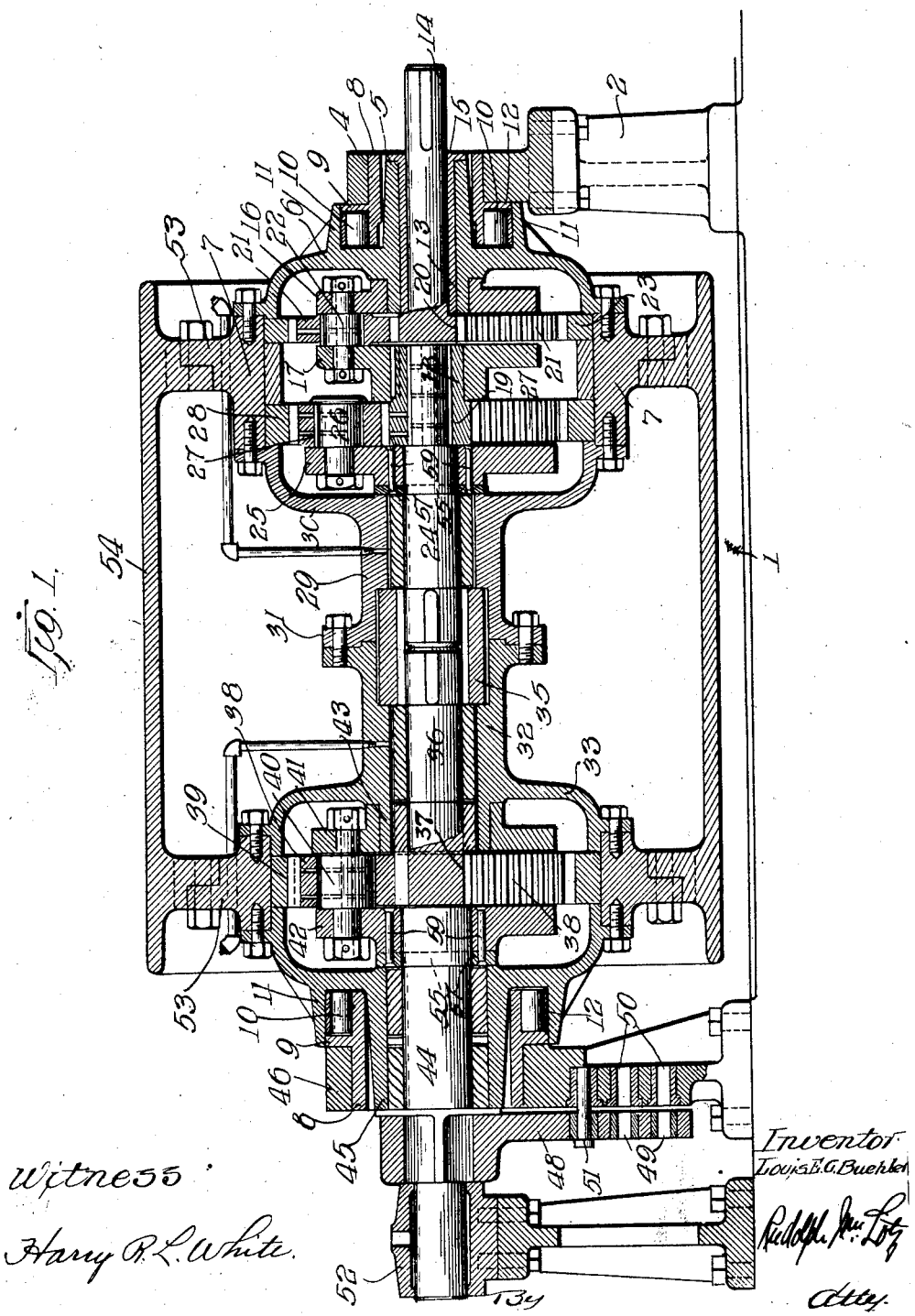
Figure 1 is a central longitudinal section of a pulley and speed reducing mechanism constructed in accordance with the invention.
Figure 2:
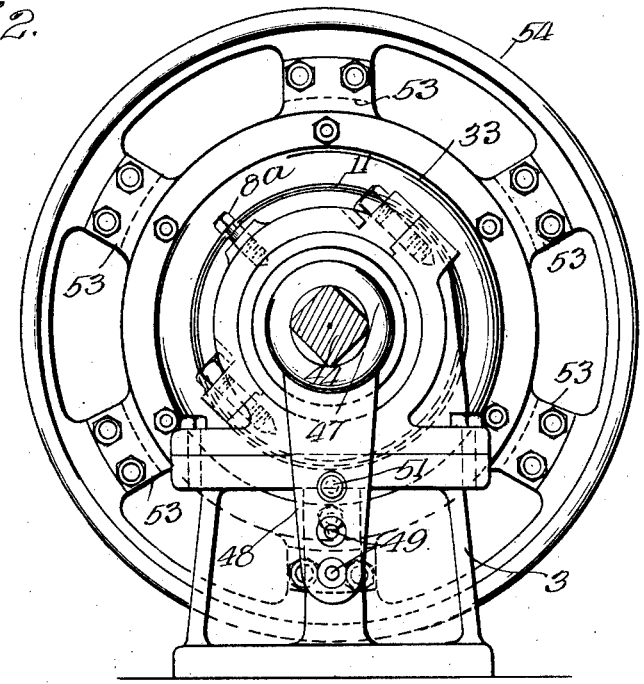

Heretofore, so far as I am informed, the speed reducing gears for pulleys, the drums of hoisting machinery and the like, have been disposed between the motor (usually electrical) and one of the bearings for the pulley, drum or the like. As the speed transformers occupy considerable space, the saving of which is always desirable, and, in most instances, very important, the present invention is very advantageous in that it effects very appreciable space economy.

In the accompanying drawings I have illustrated a planetary gear speed transformer which includes three sets of planetary gears. This is merely exemplary as it will be obvious that the number of sets of said gears may be increased or decreased in accordance with the required ratio of speed transformation.

The speed transformer of the present invention differs mainly from other structures of the same general type in that the casing thereof is divided into two main portions each of which may contain one or more sets of planetary gears and associated elements, the said casing parts being so associated that they may be spaced from each other to substantially any desired extent in a very simple and inexpensive manner as will hereinafter more fully appear, the specific advantages of this expedient being also hereinafter fully explained.

The mechanism comprises a suitable base 1 upon which the bearing standards 2 and 3 are mounted, it being understood, of course, that said base may be inverted and the members 2 and 3 thus transformed into hangers. Into the bearing 4 of the member 2, the hub 5 of the outer end wall 6 of the casing 7 projects. The said bearing is equipped with a steel sleeve 8 which projects therefrom at one end and is spaced from the said hub 5. The sleeve 8 is provided between its ends with an annular flange 9 which abuts the bearing 4, the free outer cylindrical face of said sleeve 8 lying between the said flange 9 and the inner end of said sleeve constituting the raceway for the antifriction rollers 10. Concentric with the hub 5 is an annular flange 11 lined with a steel bushing 12 between which and the sleeve 8 the rollers 10 are confined, said sleeve 8 being held rigidly in place by means of set-screws 8ª.

The details of construction described in the next preceding paragraph afford large and very strong anti-friction bearings for the housing at the least expense for metal and machining, thus permitting the hubs 5 to be of as small outer diameter as is consistent with the degree of rigidity required to maintain the shafts journalled therein properly centered and supported, neither said shafts nor hubs being subjected to any strains or stresses such as flexing due to load on the housing and parts associated therewith as hereinafter more particularly described.

This specific roller bearing structure constitutes what I believe to be an important advance in the art and an important feature of the present invention.

The hub 5 together with an inward extension 13 thereof constitutes the bearing for the high speed shaft 14 which is adapted to be coupled to a motor shaft or other high-speed drive-shaft. This bearing is provided with the usual bronze bushing 15. The portion 13 of the hub is provided with a cylindrical outer face and constitutes a bearing for the planetary gear carrier 16 which is coupled with its companion carrier 17 which is keyed to the hub 18 of the spur pinion 19. The shaft 14 is, preferably, integral with the spur pinion 20 which meshes with the planetary pinions 21 rotatable on stud-shafts 22 spanning the space between the carriers 16 and 17. The planetry pinions also mesh with the internal gear 23 rigidly mounted on the casing 7.

The spur pinion 19 is rotatable on one end of the shaft 18. A shaft 24 is provided to which the planetary gear carrier 25 is keyed, the latter being equipped with stud shafts 26 on which are rotatable the planetary pinions 27 meshing with the spur pinion 19 and with an internal gear 28 rigid with casing 7.

The shaft 24 extends into the hub 29 of the other end wall 30 of the casing 7, said hub being equipped with a suitable roller bearing.

Figure 4:
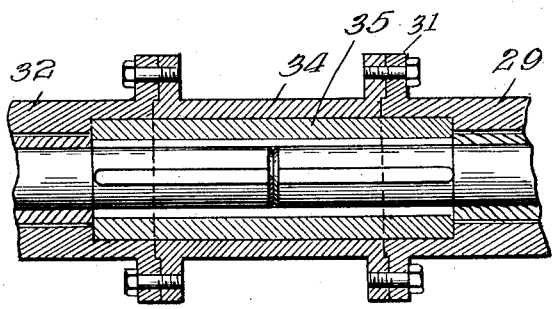
Figure 4 is a fragmentary detail sectional view illustrating the means employed for varying the length of the speed reducing mechanism to accord with the width of face of the pulley or drum associated therewith.

The hub 29 is provided with an annular flange 31 by means of which it may be coupled with the similar hub 32 of the casing 33 or with an extension sleeve 34 shown in Figure 4. It will be noted that the outer ends of the bores of the hubs 29 and 32 are annularly enlarged to receive the shaft coupling 35 for coupling the shaft 24 with the shaft 36, both said shafts being adapted to be replaced by longer shafts in instances where extension sleeves 34 are employed.

The shaft 36 is preferably integral with the spur pinion 37 meshing with planetary pinions 38 which, in turn, mesh with the internal gear 39 of casing 33. The planetary pinions 38 are rotatable on the stud shafts 40 spanning the carriers 41 and 42, the former of which is rotatable on the hub element 43 and the latter keyed to the shaft 44 journaled in the hub 45 of the casing 33.

The hub 45 projects into the bearing 46 carried by the member 3, the structure at this end of the casing 33 being identical with that of the outer end of the casing 7, the several parts being for this reason, indicated by the same reference characters.

The shaft 44 is provided between its ends with a polygonal portion 47 or an equivalent thereof for non-rotatably engaging the same with an arm 48 which is provided with a plurality of openings 49 spaced at varying distances from the axis of said shaft. The member 3 is provided with a corresponding series of openings 50. A shear pin 51 is adapted to be inserted into a pair of aligned openings 49 and 50 and serves to hold the shaft 44 against rotation and thus cause the casings 33 and 7 to rotate. A bearing 52 is preferably provided for the extreme outer end portion of the shaft 44.

The casings 7 and 33 are provided with perihperal projections 53 for coupling said casings with the pulley or drum 54 which houses the said casings. This pulley or drum 54 may be of any desired diameter consistently with the extreme diameter of the casings 7 and 33 and may also be of any width of face consistently with the minimum distance between the members 2 and 3 as determined by the minimum space required for the said casings.

Instead of employing the ordinary splines commonly employed in this class of devices, I prefer to employ the type shown in detail in Figures 6 and 7, the key element being integral with the shaft and consisting of a pair of diametrically opposed outwardly extending flanges 55 having parallel side faces which are tangential with the shaft. The said flanges 55 are adapted to enter recesses 56 in the face of a companion coupling element 57 of the part, such as a planetary gear carrier with which the shaft is to be non-rotatably associated, it being preferable to provide the flanges 55 with openings 57 and the bottom walls of the recesses 56 with aligned countersunk openings for the reception of the rivets 59, the purpose of the latter or their equivalent being to prevent all relative longitudinal movement between the coupled elements.

In use, the shear-pin 51 is inserted in any one of a pair of aligned openings 49 and 51 which may be selected, the distance of said pin from the axis of the shaft 49 and the diameter and material of said pin determining the maximum load to which the shaft 44 may be subjected and the maximum load thus determined will always be below that which is required to strip any of the gear elements in the casings 33 and 7.

In practice it has been found that ordinary splines gradually work loose and ultimately become turned in their seats and this results either in destruction of said spline or key or in the destruction of one of the parts held against relative rotation thereby. Hence the substitution of the type of spline shown in Figs. 6 and 7 is very advantageous in that it will bear a far greater strain and will not work loose under most severe usage such as shock due to sudden load imposed on a hoist or elevator belt associated with the pulley or drum.

I claim as my invention:—

1. A speed transformer including a casing adapted to carry an element to be forcibly rotated, bearings in which the opposite end portions of said casing are journalled, drive shaft and countershafts disposed axially of said casing, gearing within the latter operatively associating the several shafts for causing the same to rotate relatively to the casing at different speeds, one of said shafts projecting from one end of the casing and the other thereof from the other end of said casing, and means associated with one of said projecting shafts and a part rigid with one of said bearings for preventing rotation of said shaft to thereby cause the casing to be rotated, said means including a shear pin for determining the maximum force applied to said casing for rotating the same against resistance to such rotation.

2. A speed transformer including a casing, bearings in which the same is rotatable, drive and countershafts disposed axially of said casing and said bearings, gearing operatively associating said shafts to cause them to rotate simultaneously at respectively different speeds relatively to said casing, and means associated with one of said bearings and said countershaft for holding the latter against rotation to thereby cause the casing to rotate responsively to rotation of the drive-shaft, said means including a severable element adapted to determine the maximum strain to which the rotating elements may be subjected.

3. A speed transformer of the type herein-described including a casing consisting of two separable main portions adapted to be rigidly coupled, each of said portions containing gearing, a discontinuous shaft extending from one of said portions to the other thereof for operatively associating the gearing in one thereof with the gearing in the other thereof, a shaft coupling associated with said discontinuous shaft and disposed to span the joint between said portions, said joint arranged to permit the interposition of an extension sleeve between said portions to thereby extend the length of the casing, said sleeve arranged for coaction with the opposed joined portions of said casing portions to permit the insertion of shaft couplings of lengths proportionate to the increased length of the casing.

4. A speed transformer including a pulley or the like, a casing housed by and carrying the same, bearings for the ends of the casing in which the latter is rotatable, drive and countershafts extending axially of said casing, the latter comprising two main portions having opposed coupled hub portions, gearing in each of said main portions for operatively associating the several shafts, the latter including a discontinuous shaft and a coupling for the same, the latter disposed in said opposed hub portions and spanning the joint therebetween, said joint permitting the interposition of an extension sleeve and the insertion of a shaft coupling of length proportionate to said extension sleeve.

5. In a speed transformer including a plurality of sets of speed transforming gears, each set having a housing independent of the other, said housings disposed in axial alignment and having opposed hubs coupled with each other against relative rotation, said hubs provided in their opposed ends with annular recesses together constituting a bearing for a shaft coupling, axially aligned shafts constituting parts of the respective speed transforming gear sets associated with said coupling to thereby operatively associate said gear sets, said coupling arranged for replacement by a coupling of greater length and said hubs arranged for the reception therebetween of an extension sleeve to thereby vary the axial length of the whole structure to accommodate pulleys and the like of different widths of face.

6. In a speed transformer including a plurality of sets of speed transforming gears, each set having a housing independent of the other, said housings disposed in axial alignment and having opposed hubs, an extension sleeve adapted to be interposed between and rigidly secured to said hubs, a shaft coupling adapted to be journalled in said sleeve and said hubs, and associated with axially aligned shafts of the respective gear sets for operatively associating the latter.

7. In a speed transformer including a plurality of sets of speed transforming gears, each set having a housing independent of the other, said housings disposed in axial alignment and having opposed hubs, said hubs provided in their opposed ends with annular recesses together constituting a bearing for opposite end portions of a shaft coupling for associating axially aligned shafts of the respective gear sets to thereby operatively associate the latter with each other, said shaft coupling interchangeable with similar couplings of greater length, and an extension sleeve adapted to be interposed between and rigidly secured to said hubs to constitute a bearing for the middle portion of a longer coupling.

8. A speed transformer including a rotatable housing provided at opposite ends with bearings for the operating shafts, bearings for the opposite ends of said housing, each including an annular flange integral with and concentric with the bearing at the corresponding end of the housing, a supporting member equipped with a cylindrical member of smaller diameter than and projecting into said annular flange of said housing, and anti-friction rollers interposed between said flange and said cylindrical member.

LOUIS E. G. BUEHLER.